(12) United States Patent
Lee et al.

(10) Patent No.: US 9,297,136 B2
(45) Date of Patent: Mar. 29, 2016

(54) INFLATABLE DAM ASSEMBLY

(71) Applicants: Christopher Eugene Lee, Chester (GB);
Eamonn Henry Lee-Barrett, Ipswich (GB)

(72) Inventors: Christopher Eugene Lee, Chester (GB);
Eamonn Henry Lee-Barrett, Ipswich (GB)

( * ) Notice: Subject to any disclaimer, the term of this patent is extended or adjusted under 35 U.S.C. 154(b) by 0 days.

(21) Appl. No.: 14/254,201

(22) Filed: Apr. 16, 2014

(65) Prior Publication Data

US 2014/0369759 A1   Dec. 18, 2014

(30) Foreign Application Priority Data

Jun. 10, 2013   (GB) .................................. 1310299.1
Jan. 30, 2014   (GB) .................................. 1401553.1

(51) Int. Cl.
*E02B 7/20*   (2006.01)
*E02B 7/00*   (2006.01)
*E04H 9/14*   (2006.01)
*E02B 3/10*   (2006.01)

(52) U.S. Cl.
CPC . *E02B 7/20* (2013.01); *E02B 3/104* (2013.01); *E02B 7/005* (2013.01); *E04H 9/145* (2013.01)

(58) Field of Classification Search
CPC .......... E02B 7/005; E02B 7/20; E02B 3/104; E04H 9/145
USPC ......................................... 405/107, 110, 115
See application file for complete search history.

(56) References Cited

U.S. PATENT DOCUMENTS

| 3,355,851 | A | * | 12/1967 | Imbertson et al. ............. 405/115 |
| 4,836,713 | A | * | 6/1989 | Muramatsu et al. .......... 405/115 |
| 4,887,626 | A | * | 12/1989 | Dalo et al. ..................... 135/119 |
| 4,906,134 | A | * | 3/1990 | Hoyeck .......................... 405/115 |
| 5,709,502 | A | * | 1/1998 | Obermeyer ...................... 405/87 |
| 6,029,405 | A |   | 2/2000 | Wood |
| 2003/0167696 | A1 |   | 9/2003 | Chen |
| 2010/0200037 | A1 | * | 8/2010 | Saiz et al. ...................... 135/115 |

FOREIGN PATENT DOCUMENTS

| DE | 3823586 A1 | 1/1990 |
| GB | 2223528 A | 11/1990 |
| GB | 2458941 A | 7/2009 |
| NL | 1002721 C1 | 6/1997 |
| NL | 1016490 C2 | 5/2002 |
| WO | 9739192 A1 | 10/1997 |

\* cited by examiner

*Primary Examiner* — Tara M. Pinnock
(74) *Attorney, Agent, or Firm* — Hayes Soloway, P.C.

(57) ABSTRACT

This invention relates to an inflatable dam assembly. The assembly includes a combined inflation, sealing and anchoring arrangement for a self-supporting dam. The inflatable dam assembly has an inflatable membrane and structure for inflating the membrane. An anchoring element operably engages with the inflatable membrane. A duct houses the anchoring element and provides at least a part of said membrane. The duct includes retaining structure configured to retain the anchoring element within the duct. In use, the anchoring element is moveable relative to the duct in a first direction towards the retaining means and in a second direction away from the retaining structure.

14 Claims, 8 Drawing Sheets

INFLATABLE DAM ASSEMBLY

BACKGROUND a. Field of the Invention

This invention relates to an inflatable dam assembly. In particular, this invention relates to a combined inflation, sealing and anchoring arrangement for a self-supporting dam for protecting buildings and property from rising flood water.

b. Related Art

When flood water rises above normal ground level it begins to infiltrate building fabrics exploiting any weakness in/or absence of damp proofing arrangements. If the flooding below the damp proof course is sustained or rises to apertures within the building envelope severe damage to the property and its contents occurs. Severe flood water damage usually renders a property uninhabitable for long periods of time.

A number of flood defense systems for buildings and other structures are known; however, many of these systems have disadvantages in relation to cost, size and the ease and speed of deployment when flooding occurs.

It is, therefore, an object of the present invention to provide an inflatable dam assembly that overcomes the disadvantages of prior art systems.

SUMMARY OF THE INVENTION

According to a first aspect of the present invention there is provided an inflatable dam assembly comprising:
an inflatable membrane;
means for inflating said membrane;
an anchoring element operably engaged with the inflatable membrane; and
a duct for housing the anchoring element and at least a part of said membrane, the duct comprising retaining means configured to retain the anchoring element within the duct,
wherein, in use, the anchoring element is moveable relative to the duct in a first direction towards the retaining means and in a second direction away from the retaining means.

Preferably the anchoring element is movable between a first position in which the membrane is not clamped between the anchoring element and the retaining means, such that there is a gap between the membrane and the retaining means, and a second position in which a part of the membrane is clamped between the anchoring element and the retaining means.

Preferably the duct has opposing side walls and the retaining means comprises a first protrusion extending inwardly from a first one of said side walls and a second protrusion extending inwardly from a second one of said side walls.

Preferably the retaining means comprises a pair of opposing first and second protrusions forming a neck region of the duct, a dimension of the neck region being smaller than a dimension of the anchoring element, such that the anchoring element cannot pass through the neck region of the duct. A lower region of the duct may, therefore, be defined between a base of the duct and the neck region, and the anchoring element may be housed within said lower region. Preferably a distance between the base of the duct and the neck region is at least two times a dimension of the anchoring element.

In embodiments in which the retaining means comprises protrusions, the protrusions preferably have a substantially semi-cylindrical shape.

Preferably the anchoring element is substantially cylindrical.

In preferred embodiments the anchoring element is provided within the inflatable membrane.

In embodiments in which the retaining means comprises protrusions, the duct preferably comprises separate first and second components, the first component including the first protrusion and the second component including the second protrusion. The first and second components are preferably secured to each other to form the duct.

In preferred embodiments the inflatable dam assembly further comprises a membrane terminating element including guide means engaged with an end region of the inflatable membrane. Preferably the guide means comprises a guide rod and the end region of the inflatable membrane includes a plurality of apertures through which the rod is received.

According to a second aspect of the present invention there is provided a method of installing an inflatable dam assembly, the dam assembly comprising an inflatable membrane, means for inflating said membrane, an anchoring element, and a duct having retaining means, and the method comprising the steps of:
positioning the duct in a trench in the ground;
operably engaging the anchoring element with the inflatable membrane;
positioning the anchoring element within the duct such that the retaining means retain the anchoring element within the duct; and
connecting said inflating means to the membrane to permit inflation of the membrane,
wherein the duct is configured such that the anchoring element is moveable relative to the duct in a first direction towards the retaining means and in a second direction away from the retaining means.

In preferred embodiments the duct has opposing side walls and the retaining means comprises opposing first and second protrusions, a first protrusion extending inwardly from a first one of said side walls and a second protrusion extending inwardly from a second one of said side walls, and the duct comprises separate first and second components, the first component including the first protrusion and the second component including the second protrusion. In these embodiments the method preferably comprises:
inserting the first component into the trench;
positioning the anchoring element with respect to the first component;
inserting the second component into the trench, such that the first and second protrusions retain the anchoring element within the duct; and
securing the second component to the first component.

The present invention is the key part of an impervious self-supporting dam system deployed away from any structure/site to be protected. The dam activation medium is self-contained, non-perishable and not dependant on external energy sources such as electricity which could be lost prior to flooding occurring.

This invention prevents water ingress between dam and the ground by utilising a loose anchor element that wedges itself against two lower fixed points (usually below ground). As a membrane inflates it creates a seal on the inner (side to be protected) fixed point and stabilises itself against a further set of secondary upper fixed points (usually at ground level). By continuing this inner fixed point from its normal horizontal position to a vertical orientation a continuous seal can be achieved up a vertical surface from the horizontal inner fixed point below ground.

As this system is self-supporting it is able to be installed away from any structure's to be protected. This ensures that natural air movement around the structure's fabric is maintained so minimising the risk of damp penetration.

This invention could be activated by operating a simple hand valve or automatically triggered by a float switch arrangement or water level sensor/s detecting rising water conditions.

It is possible that if chemical toilets, water storage and generator back-up were in place or temporarily available the protected building could remain habitable so that the flood situation could be monitored and the property remain secured from possible looting.

BRIEF DESCRIPTION OF THE DRAWINGS

The invention will now be further described by way of example only and with reference to the accompanying drawings, in which.

DETAILED DESCRIPTION

Figure 1:
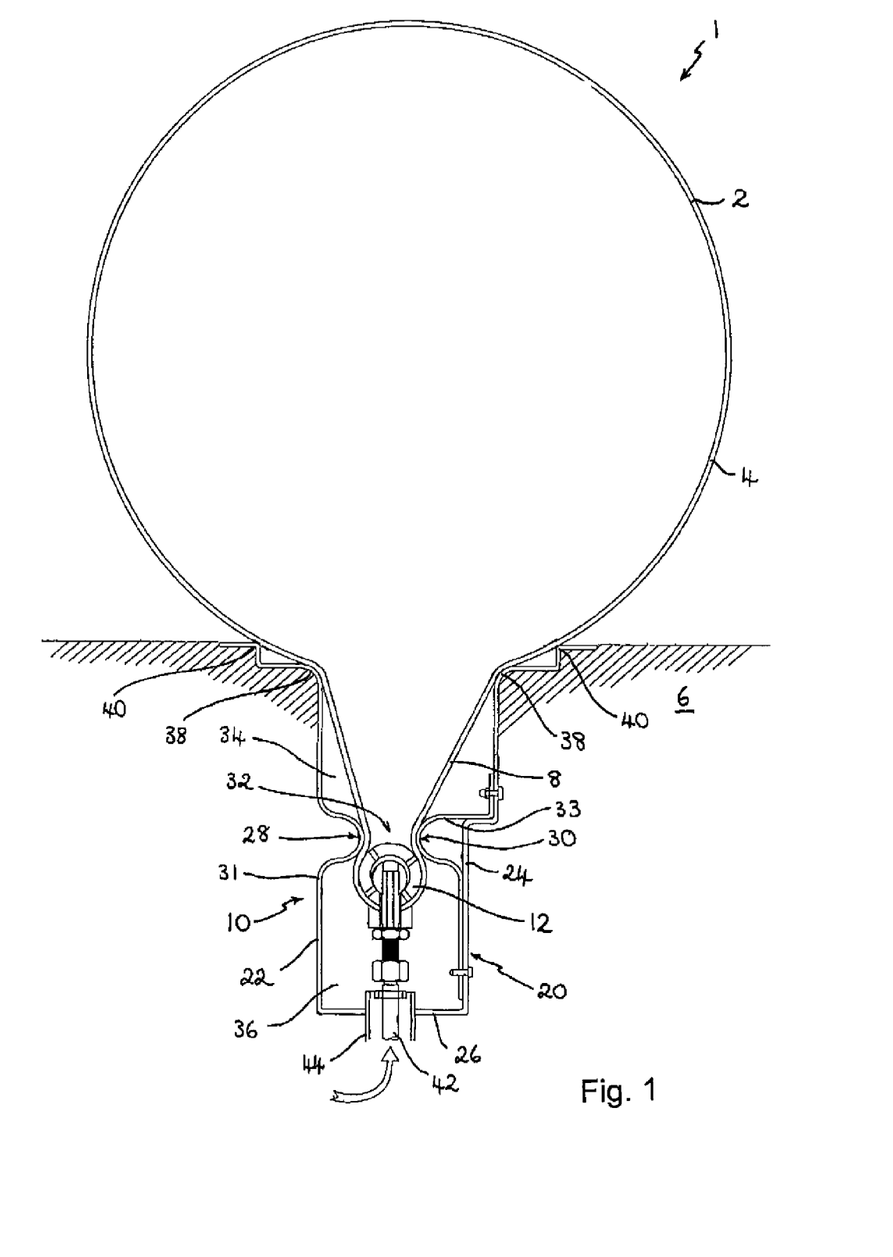
FIG. 1 shows an inflatable dam according to a first preferred embodiment of the present invention, and illustrates in particular the dam inflation, anchoring and sealing arrangement.

FIG. 1 shows an inflatable dam 1 according to a preferred embodiment of the present invention. The inflatable dam 1 comprises a membrane 2 that, when inflated, provides a barrier to flood waters.

In its inflated state an upper portion 4 of the membrane 2 is located above the level of the ground 6 and a lower portion 8 of the membrane 2 is retained below the level of the ground 6 within anchoring means 10. The upper portion 4 of the membrane 2 has a substantially cylindrical shape when fully inflated.

An anchoring and inflation assembly 12 is retained within and encapsulated by the membrane 2. In this embodiment the anchoring and inflation assembly 12, shown more clearly in FIG. 2, comprises an anchoring element 14, an inflation manifold 16 and a means 18 for connecting the inflation manifold 16 to a source of compressed gas, for example compressed air.

Figure 2:
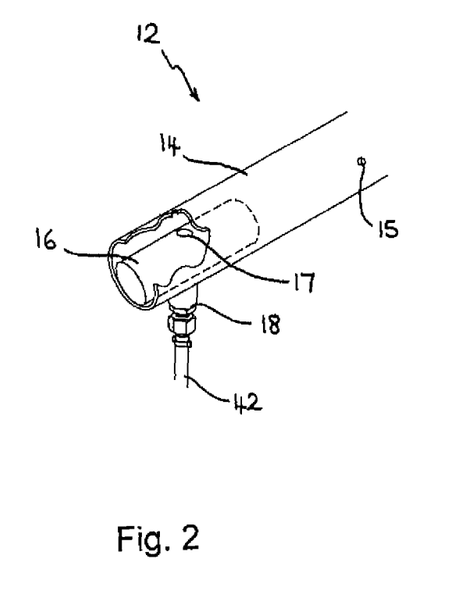
FIG. 2 shows a connection between a means for inflating the dam and dam anchoring means of the inflatable dam of FIG. 1.

In this embodiment the anchoring element 14 is a substantially cylindrical tube and the inflation manifold 16, also in the form of a substantially cylindrical tube, is positioned within the anchoring element 14. Both the anchoring element 14 and the inflation manifold 16 include one or more holes 15, 17.

The anchoring means 10 comprises a duct 20 installed in the ground 6. The duct 20 has opposing, substantially vertical side walls 22, 24 and a base 26. A top of the duct 20 is open such that the duct is in the form of a substantially U-shaped channel. The duct 20 comprises retaining means or detents 28, 30 that extend inwardly from each of the side walls 22, 24. The detents 28, 30, therefore, create a narrow neck region 32 of the duct 20 and an upper chamber 34 is defined in an upper region of the duct 20 above the detents 28, 30 and a lower chamber 36 is defined in a lower region of the duct 20 below the detents 28, 30.

The duct 20 is preferably formed from two components 31, 33. A main component 31 includes at least the base 26 of the duct 20, together with one of the side walls 22 and its associated detent 28. A second component 33 includes at least a part of the second one of the side walls 24 and the associated detent 30.

The underground duct section 20 can be readily manufactured in a wide range of materials which include, but are not limited to, Thermoplastics, Thermosetting Plastics, Aluminium, Plated Steel, Stainless Steel, Reinforced Resins and Concrete.

Figure 3:
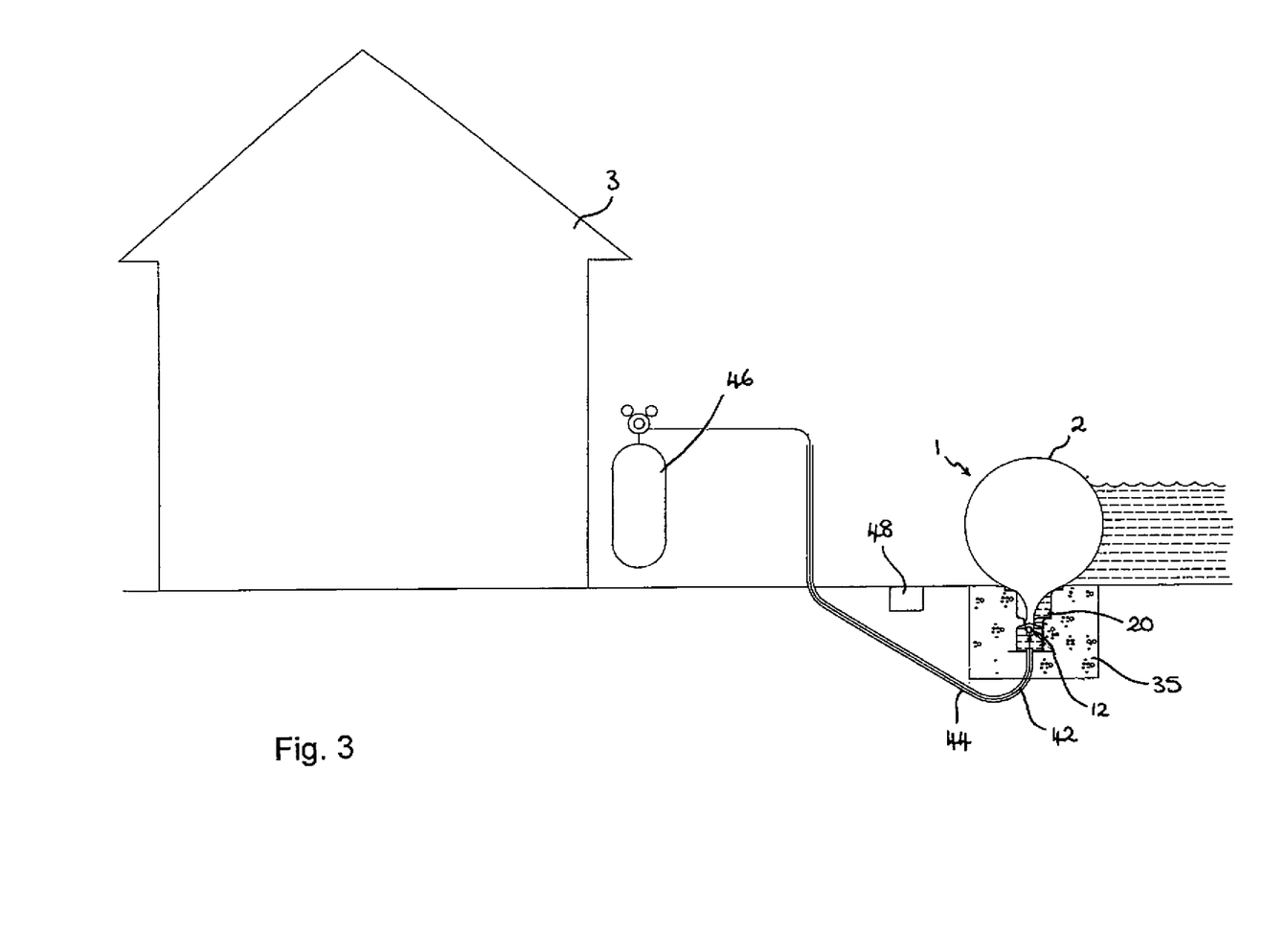
FIG. 3 shows the inflatable dam of FIG. 1 installed in a flood defense location at a distance from a building structure.

Preferably, the main duct 20 is surrounded on either side with concrete 35 of suitable mass to serve as a robust foundation to resist the lifting and rolling forces exerted on the membrane 2 when in use, as shown most clearly in FIG. 3.

The detents 28, 30 preferably comprise opposing ridges or lobes that protrude into an interior space of the duct 20. The detents 28, 30 preferably have a semi-cylindrical profile and extend along the length of the duct 20. Although the detents 28, 30 are described and shown in this embodiment as having a convex curved inwardly facing surface, it will be appreciated that in other embodiments the detents 28, 30 may be of any suitable shape for retaining the anchoring element 14 and membrane 2 as described below.

Figure 6:
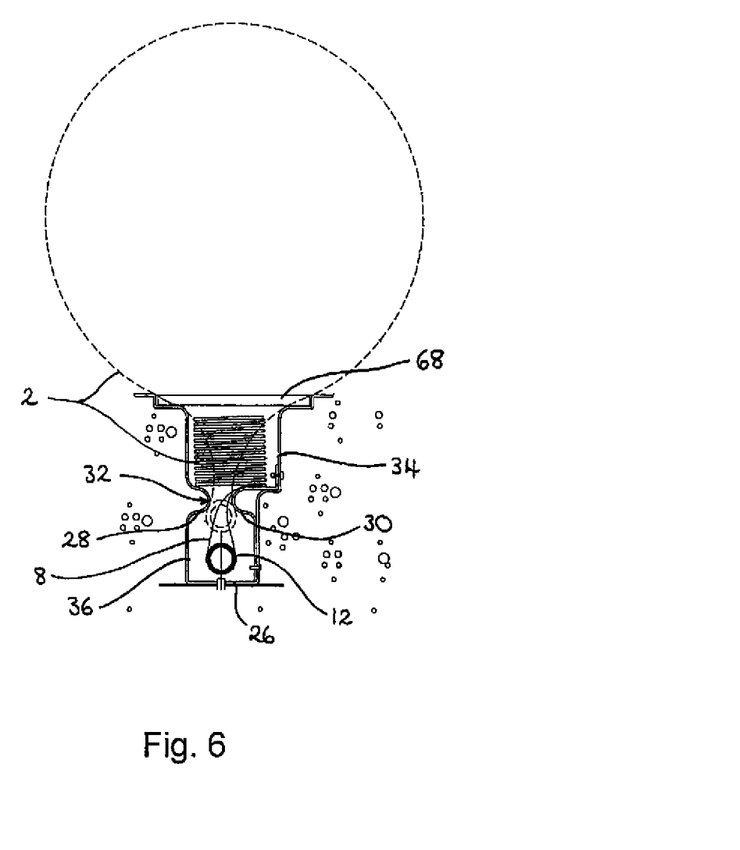
FIG. 6 shows an inflatable dam according to a preferred embodiment of the present invention in a stowed and covered configuration below ground (solid lines) and an uncovered and deployed configuration (dashed lines)

The lower chamber 36 houses the anchoring and inflation assembly 12 within the lower portion 8 of the inflatable membrane 2 with the remainder of the membrane 2 being stowed in the upper chamber 34, as illustrated most clearly in FIG. 6.

The distance between the detents 28, 30, i.e. the width of the neck region 32, is slightly smaller than the width or diameter of the anchoring element 14, therefore not allowing it to be pulled out of the duct 20 by membrane 2 when inflated and promoting angular contact between the anchoring element 14 and surfaces of the detents 28, 30 creating a wedging action.

The lower chamber 36 is sized to permit vertical movement of the anchoring and inflation assembly 12, as illustrated in FIG. 6. Accordingly, a height of the lower chamber 36, i.e. the distance between the base 26 and the neck region 32 of the duct 20, is greater than a height or diameter of the anchoring element 14. This allows the anchoring and inflation assembly 12 to move between a first position in which the anchoring element 14 is spaced away from the detents 28, 30 and there is a gap between the membrane 2 and at least one of the detents 28, 30, and a second position in which the anchoring element 14 clamps or seals the membrane 2 against the detents 28, 30, as explained further below. Preferably the height of the lower chamber 36 is at least two times the diameter of the anchoring element 14, but the height of the lower chamber 36 may be between 150% and 300% of the diameter of the anchoring element 14.

One advantage of the anchoring and inflation assembly 12 being significantly smaller than the lower chamber 36 of the duct 20 it is placed in, is that there is little risk of the membrane 2 being damaged during installation of the inflatable dam 1. Accordingly, installation is a task that can be undertaken without any specialist training.

A second advantage is that it allows the anchoring element 14 to be seated on the base 26 of the lower chamber 36 of the duct 20 when the membrane is in a stowed, or non-deployed, position, thereby allowing any rainfall to wash any accumulated sediment past the detents 28, 30 when the dam 1 is not in use. Furthermore, when the membrane 2 is deployed and inflated, the detents 28, 30 are wiped clean as the membrane 2 inflates and rises into position.

Although anchoring element 14 and detents 28, 30 are depicted as rounded in shape, other geometries could also be used, including but not limited to, triangular, pentagon, hexagon, heptagon, octagon etc. or combinations of other geometries and rounded forms.

One advantage of having a wedging action with the anchoring element 14 pushing against the matching profiles of the detents 28, 30 is that it puts the material of the two components 31, 33 of the underground duct 20 (restrained by its concrete surround 35) in compression rather than in shear allowing the duct 20 to be more compact, i.e. less material is used in the duct and the duct is easier to handle and to transport to site.

Another advantage of having a wedging action coupled with small contact areas in this way is that a high compressive force can be applied across the sealing point allowing it to accommodate imperfections in the mating surface of the ridge profile 28, 30 of the underground duct 20, i.e. the surface of the detents 28, 30 against which the membrane 2 is clamped by the anchoring element 14.

As membrane 2 inflates it sandwiches itself between anchoring element 14 and both matching ridges 28, 30 creating a continuous compression seal at least on the fixed ridged profile 28. In other words, a part of the membrane is clamped between the anchoring element 14 and both matching ridges 28, 30. This arrangement of having a single sealing surface and allowing the lower chamber 36 to fill with water when in use has the advantage of not having to seal any part of the secondary removable component 33 to the main component 31. In this way, only one side of each end of main duct section needs a seal/gasket, the side incorporating the fixed prominent ridge 28. This could be a gasket strip or a bead of flexible sealant/chemically hardened compound placed vertically from top to bottom which is simply trimmed flush with fixed prominent ridge 28 before membrane 2 and the secondary component 33 is installed. It is also possible to cast the main component 31 of the underground duct 20 with in-situ concrete using two part formers and a continuous pour technique thus eliminating the need for gaskets/sealants.

A second pair of prominent ridges/radius corners 38, 40 located at an upper end of each of the side walls 22, 24, stabilise the inflated membrane 2 from rolling when subjected to water pressure on one side, due to flood waters. The inflation pressure of the membrane 2 can be up to 8 bar above atmospheric pressure which means it can resist side pressure in a similar way a motor vehicle tyre does when cornering. Therefore, this arrangement requires no additional support to be added in order to resist imposed side movement of the membrane 2 when inflated.

The materials of which the membrane 2 can made include but are not limited to Kevlar Cloth and Polyaramid Cord impregnated with Vulcanized Neoprene Rubber.

The membrane 2 is inflated via the perforated, semi-rigid anchoring element 14 and the inflation manifold 16 by a flexible hose 42 within a conduit 44 connected to one or more remote gas cylinders 46 or a compressor backed-up by one or more cylinders (shown in FIG. 3). Manifold 16 also serves as a clamping nut into which a proprietary gas connection may be screwed, using the membrane 2 as a gasket seal between the anchoring element 14 and the gas connection assembly.

The materials from which the anchoring element 14 can be made include, but are not limited to, Polypropylene, Polythene and Nylon. The materials from which the inflation manifold 16 can be made include, but are not limited to, Stainless Steel, Plated Steel, Thermoplastics materials, Brass, Aluminium Bronze and Copper.

Figure 4:
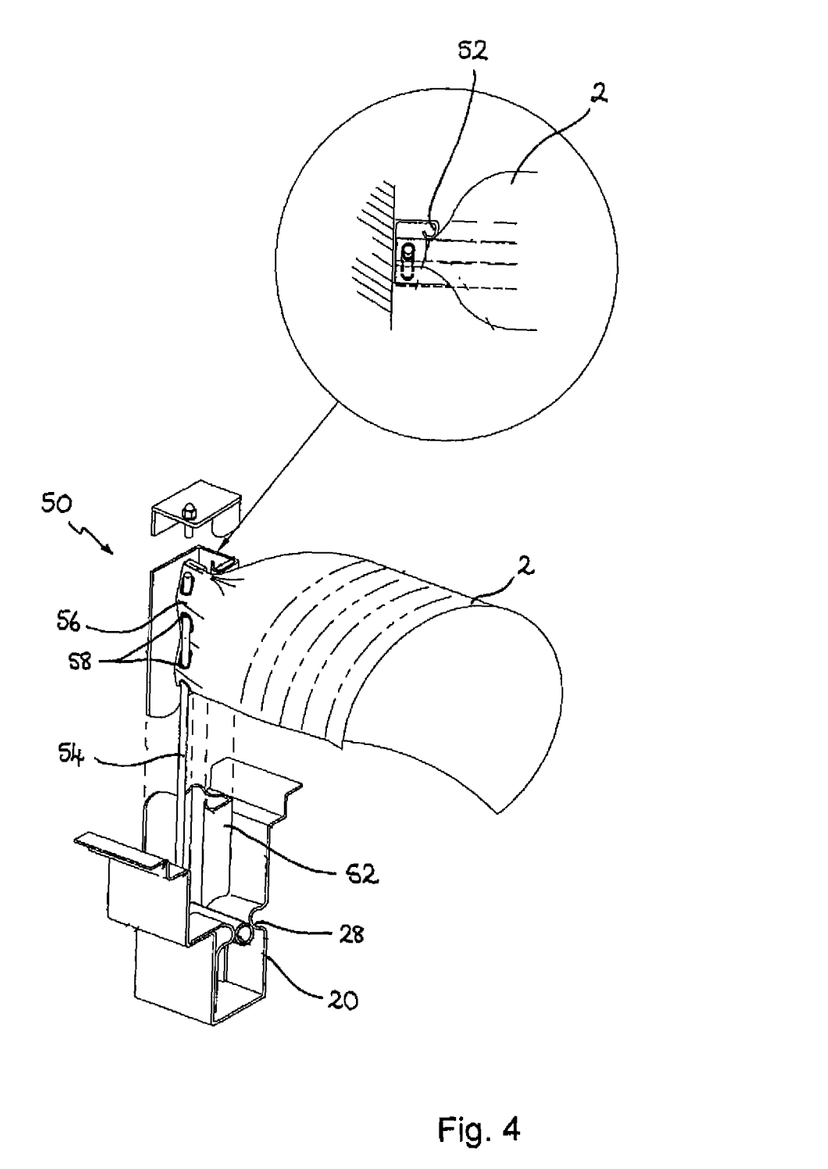
FIG. 4 shows an arrangement for terminating an inflatable membrane of an embodiment of the inflatable dam.

All drains serving a protected building 3 would be fitted with proprietary non-return type flood protection devices and down pipes from guttering would be temporarily diverted to flow over the inflatable dam 1 to cope with rain fall-off from the roof/s. It is inevitable that some storm water will collect between the dam 1 and the building 3 due to continued rainfall, water lapping over the dam 1 from bow waves of passing rescue vehicles/boats or prolonged seepage under the dam 1 etc. It would, therefore, be preferable to install a proprietary drive channel drain system 48 connected to a sump and pump arrangement to ensure the protection of a building 3 is maintained over longer periods of flooding.

Where there is a need for the inflatable membrane 2 to be attached to a structure/s, a membrane terminating element 50 is used. The membrane terminating element 50 comprises a vertically extending protrusion 52 having a profile or shape substantially the same as the horizontally extending detent 28. This vertical section 52 having a prominent ridge profile extends upwards to above the height of the inflated membrane 2, as illustrated in FIG. 4.

This vertical profile element 52 works in a similar way to the underground duct arrangement 20 where membrane 2 is sealed against the prominent ridge profile 52, but instead of being anchored by an anchoring element, a vertical pre-tensioned rod or pole 54 is used. This vertical rod or pole 54 being in tension resists horizontal forces applied when in use. Sealed end portions 56 of the membrane 2 are perforated with slots or holes 58 through which the rod or pole 54 extends. The slots or holes 58 are arranged to allow the sealed end portion 56 to rise vertically up the retaining rod or pole 54 when the membrane 2 is inflated from a stowed position underground.

The materials from which the vertical profile element 52 can be made include, but are not limited to, Stainless Steel, Plated Steel and Concrete. The materials from which the vertical rod or pole 54 can be made include, but are not limited to, Stainless Steel, Plated Steel, Brass and Aluminium Bronze.

This vertical profile termination arrangement 50 has the advantage that it can be secured to the side of any structure such as a bridge over a river or an existing sea/harbour wall.

Furthermore, two vertical profile elements 52 bolted or otherwise secured together in a back to back arrangement (not shown) can allow two membranes 2 to be connected together making it possible for membranes 2 of different heights or materials/duty and/or inflation pressures to be used in combination in a membrane run to protect a particular structure or dwelling. This back to back arrangement has the particular advantage of allowing a section or sections of a membrane run to be deflated in order to allow flood control by purposely creating a flood plain upstream of any section under threat of being breached or structure such as a bridge being overwhelmed or damaged.

Another less obvious advantage of using this back to back arrangement is to create an exact demarcation boundary point between areas of responsibility e.g. between Local Governments or Public to Private or Military/Defense installations.

Groups of buildings such as housing estates or villages may have a continuous membrane run across the low lying areas prone to flooding and running up to higher ground, stopping in a simple sealed end/terminating arrangement, such as that described above. Alternatively, whole communities may be encircled by a continuous membrane.

Figure 5A:
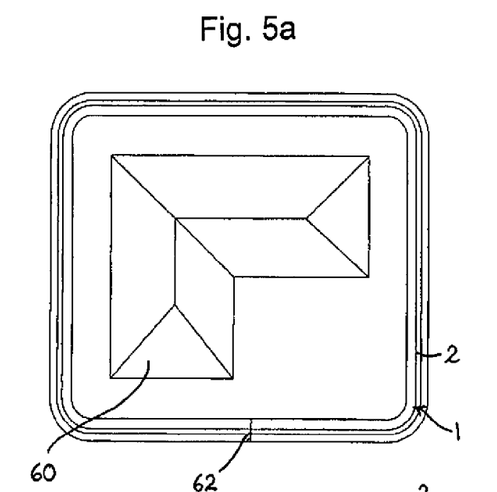
FIGS. 5a to 5c show plan views of inflatable dams according to the present invention installed around detached, semi-detached and terraced buildings.

Detached buildings 60 may have a continuous dam 1 extending around the external walls with one single, joint 62 in the membrane 2, preferably located on a straight run, as illustrated in FIG. 5a. Alternatively, overhead services could be disconnected and an already completed, continuous membrane 2 lifted over the building 60 and overhead services reconnected.

Figure 5B:
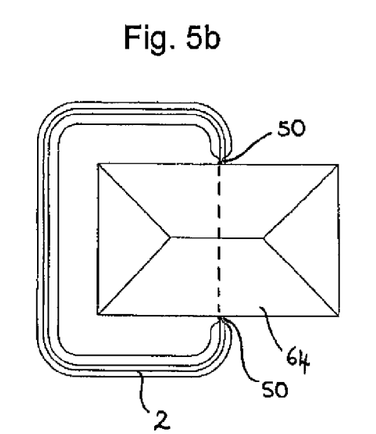
Figure 5C:
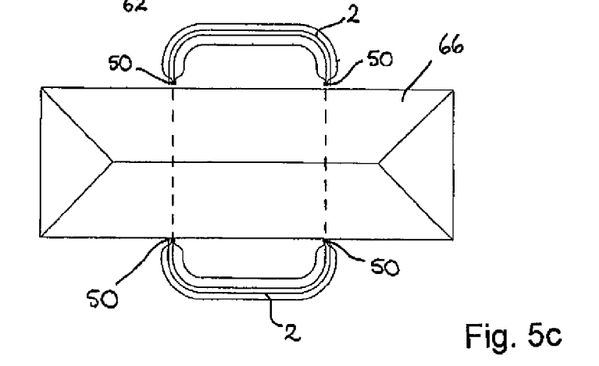

Semi-detached and terraced buildings 64, 66 or obstructing structures require the internal fixed prominent ridge 28 to be continued from its underground position up the structure's vertical surface by means of a vertical profile element 52 within the termination arrangement 50.

The membrane 2 when in the stowed position is preferably covered with a non-perishable loose fitting cover 68 which is displaced during inflation, as shown in FIG. 6. This cover 68 can be simply laid in the underground duct 20 or tethered to it. The cover 68 may be seated on the radius corners 38 at the top of the duct side walls 22, 24. The materials used for the manufacture of this cover 68 include, but are not limited to, Cast Iron, Plated Steel, Stainless Steel, Aluminium, Reinforced Resins, Thermoplastics materials and Concrete.

In FIGS. 1 to 8, the duct 20 has been depicted as comprising an extruded profile. In particular the main component 31 of the duct 20 comprises a first extruded profile including the base 26, side walls 22, 24 and detent 28. The second component 33 comprises an extruded profile that includes the second detent 30, and at least a part of the second component 33 has a shape that matches the profile of a part of the second side wall 24. In this way, the second component 33 may be secured to the main component 31 by means of bolts or other suitable fixing means such that a part of the second component 33 is in contact with a part of the side wall 24 of the main component 31.

Figure 7:
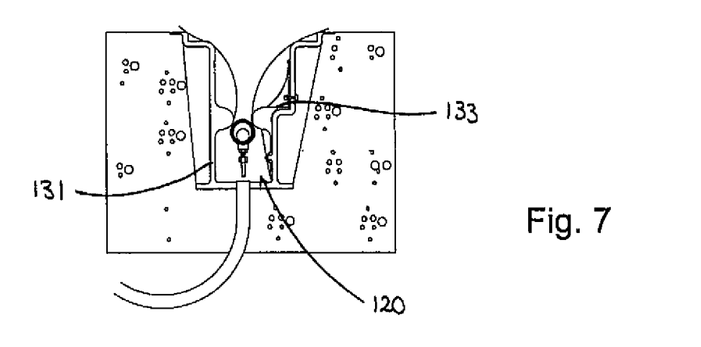
FIGS. 7 to 9 show alternative constructions of anchoring means of an inflatable dam according to embodiments of the present invention.
Figure 8:
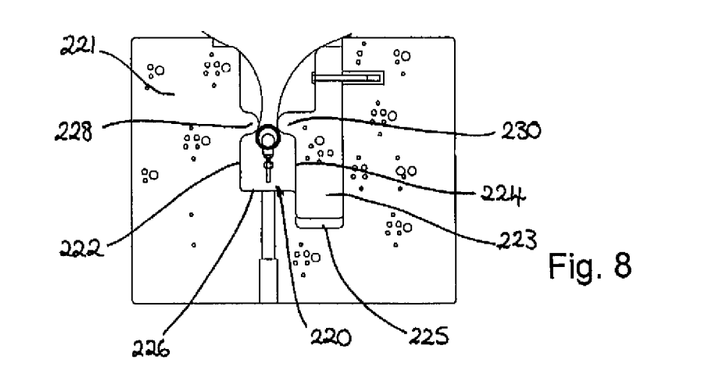
Figure 9:
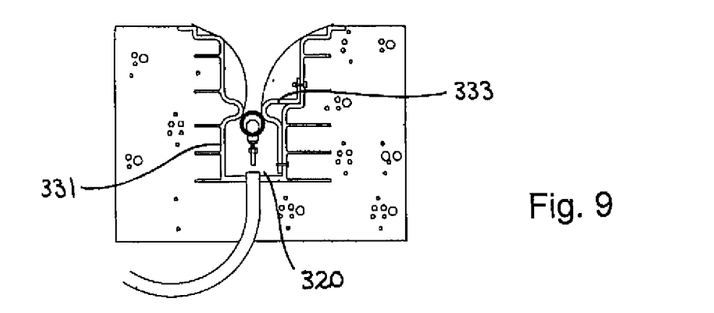

It will be appreciated, however, that many other methods of construction could be used to form the duct 20. Examples of some other methods of production for the underground duct are illustrated in FIGS. 7 to 9. FIG. 7 shows a main component 131 and a second component 133 of duct 120 that have been formed by moulding. FIG. 8 shows an embodiment of a duct 220 in which the base 226, side wall 222 and first detent 228 are formed by surfaces of a first region 221 of cast material, for example cast concrete. The second side wall 224 and second detent 230 are formed by surfaces of a second region or block 223 of cast material, for example cast concrete. In this embodiment the second block 223 is received within a channel 225 formed in the base 226 of the first region 221 of cast material. FIG. 9 shows a further embodiment of a duct 320 in which the main component 331 and second component 333 are extruded. Combinations of different materials may be used for the main component 31, 131, 221, 331 and the removable component 33, 133, 223, 333 of the underground duct 20, 120, 220, 320.

To install the inflatable dam assembly 1 of the present invention, first the main component 31 of the two part underground duct 20 is installed in the ground 4.

The main component 31 of the duct 20 incorporating fixed detent or prominent ridge 28 is preferably laid within a simple trench on a bed of concrete with its uppermost surfaces flush with the ground level and fixed detent or prominent ridge 28 orientated toward the buildings/site to be protected by the inflatable dam 1. The continuous cylindrical membrane 2 encasing the anchoring element 14 is then loosely placed within the main component 31 of the duct 20, with the anchoring element 14 below the detent 28. The second removable component 33 of the underground duct 20 having the matching detent or ridged element 30 is then secured into position, thereby forming the upper and lower chambers 34, 36 within the duct 20.

The method of installation of an inflatable dam assembly according to the present invention will now be described in more detail with reference to FIGS. 10a to 10e.

Figure 10A:
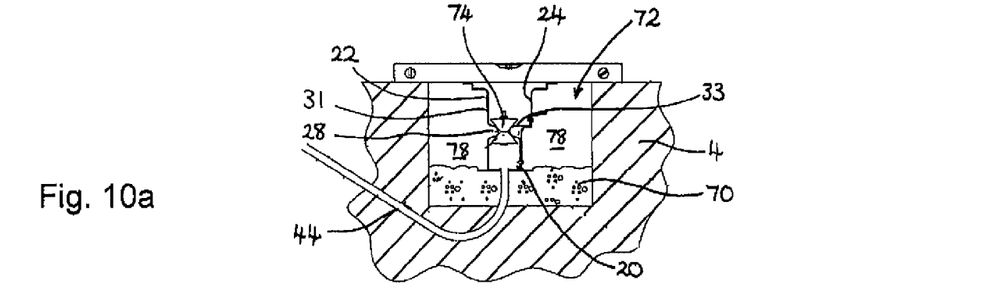
FIGS. 10a to 10e show stages in the method of installation of an inflatable dam according to the present invention.

In Stage 1 both components 31, 33 of the two part duct section 20 are bedded on a layer of concrete 70 within a trench 72 in the ground 4 so that the tops of its side walls 22, 24 are flush with the surrounding ground level. The first section of duct 20 is placed over a conduit run 44 so as to allow the flexible inflation hose to pass through. Each subsequent section of duct 20 is aligned with each other so that detent or prominent ridge 28 forms a continuous sealing surface along all sections installed. To assist in this alignment an optional guide assembly 74 comprising two wedge-shaped components 76 bolted or otherwise secured together may be used. The guide assembly is located such that the two wedge-shaped components straddle the detents or prominent ridges 28, 30, as illustrated most clearly in FIG. 10b.

In Stage 2 of the installation, spaces 78 between each side wall 22, 24 of the underground duct 20 and respective side walls of the trench 72 are filled with concrete, until a top surface of the concrete is flush with the ground level. In some embodiments it may be desirable if the top surface of the concrete is slightly lower than the surrounding ground level. This would allow a more aesthetic finish to be applied such as block paving, tarmac, shingle or grass.

Figures 10B, 10C:
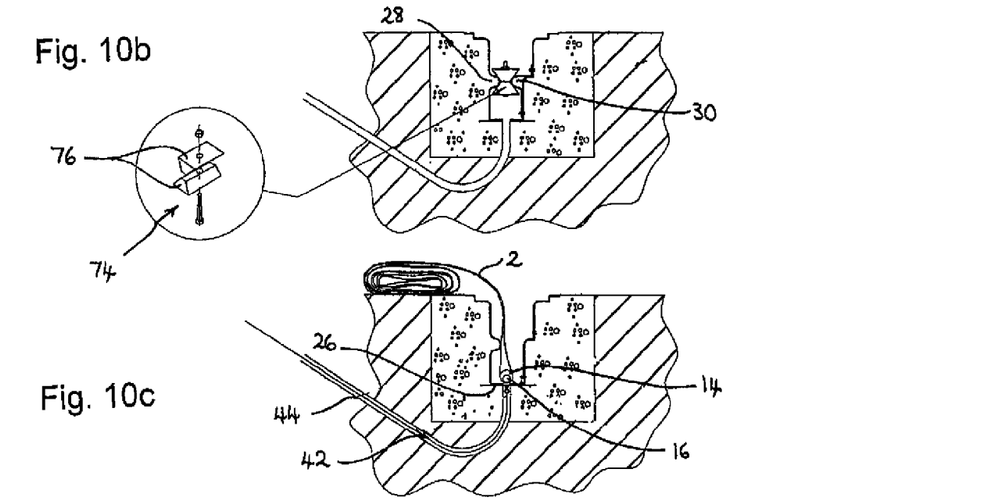

In Stage 3, when the concrete laid in Stages 1 and 2 is sufficiently cured or hardened, the removable component 33 incorporating detent or prominent ridge 30 is removed. The inflation hose 42 is connected to the inflation manifold 16, and therefore to membrane 2 and anchoring element 14. The inflation hose 42 is then fed through conduit 44 until the anchoring element 14 within a part of the membrane 2 is resting on the base 26 of the underground duct 20, as shown in FIG. 10c. The majority of the membrane 2 is laid at ground level above prominent ridge profile 28 in order to allow maximum access to the duct wall 24 opposite the prominent ridge 28.

Figure 10D:
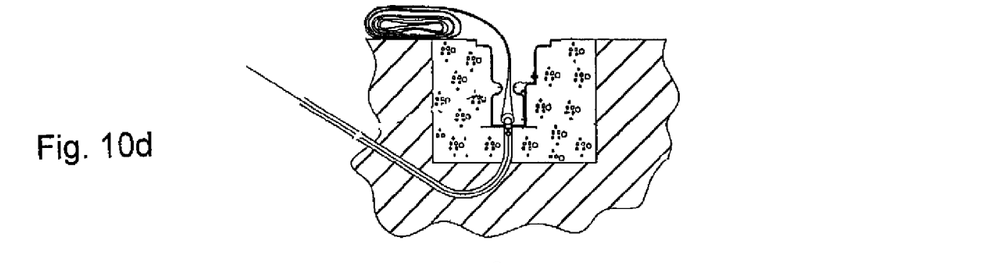
Figure 10E:
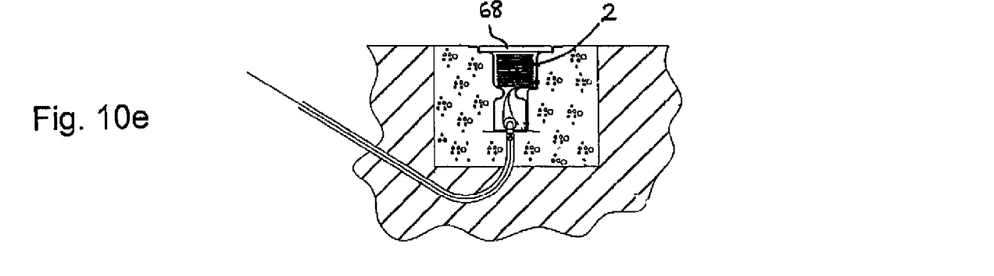

In Stage 4 the removable component 33 of the underground duct 20 incorporating prominent ridge profile 30 is secured in place, as illustrated in FIG. 10d. At this point the membrane 2 can be inflated and inspected and/or tested.

In Stage 5 the membrane 2 is folded or rolled and stowed within the underground duct 20 and enclosed by the loose fitting cover section 68.

The invention claimed is:

1. An inflatable dam assembly comprising:
   a duct having a base, substantially vertical side walls and an opening, and the duct comprising a neck region formed by a pair of retaining means including a first protrusion extending inwardly from a first one of said side walls and a second protrusion extending inwardly from a second one of said side walls, an upper chamber of the duct being defined between the neck region and the opening and a lower chamber of the duct being defined between the neck region and the base;
   an inflatable membrane;
   an anchoring element within the inflatable membrane, the anchoring element and a part of the membrane being housed within the lower chamber and the remainder of the membrane being housed within the upper chamber when the membrane is deflated, and a dimension of the neck region being smaller than a dimension of the anchoring element, such that the anchoring element cannot pass through the neck region of the duct; and an inflation manifold located within the anchoring element, both the anchoring element and the inflation manifold including one or more holes to enable inflation of the membrane, wherein, the distance between the base of the duct and the neck region is greater than a height or diameter of the anchoring element such that the anchoring element is moveable relative to the duct between a first position in which the membrane is not clamped between the anchoring element and the retaining means and a second position in which a part of the membrane is clamped between the anchoring element and the retaining means.

2. The inflatable dam assembly as claimed in claim 1, wherein the retaining means comprises a pair of opposing first and second protrusions forming a neck region of the duct, a dimension of the neck region being smaller than a dimension of the anchoring element, such that the anchoring element cannot pass through the neck region of the duct.

3. The inflatable dam assembly as claimed in claim 1 further comprising a membrane terminating element including guide means engaged with an end region of the inflatable membrane.

4. The inflatable dam assembly as claimed in claim 3, wherein the guide means comprises a guide rod and the end region of the inflatable membrane includes a plurality of apertures through which the rod is received.

5. An inflatable dam assembly comprising:
a duct having a base and an opening, and the duct comprising a neck region formed by a pair of retaining means, an upper chamber of the duct being defined between the neck region and the opening and a lower chamber of the duct being defined between the neck region and the base;
an inflatable membrane;
an anchoring element located within the inflatable membrane, the anchoring element and a part of the membrane being housed within the lower chamber and the remainder of the membrane being housed within the upper chamber when the membrane is deflated, and a dimension of the neck region being smaller than a dimension of the anchoring element, such that the anchoring element cannot pass through the neck region of the duct; and
an inflation manifold located within the anchoring element, both the anchoring element and the inflation manifold including one or more holes to enable inflation of the membrane,
wherein, the dimensions of the lower chamber are such that the anchoring element is moveable relative to the duct in a first direction towards the retaining means and a second direction away from the retaining means.

6. The inflatable dam assembly as claimed in claim 5, wherein the anchoring element is movable between a first position in which the membrane is not clamped between the anchoring element and the retaining means, such that there is a gap between the membrane and the retaining means, and a second position in which a part of the membrane is clamped between the anchoring element and the retaining means.

7. The inflatable dam assembly as claimed in claim 5, wherein the duct has opposing side walls and the retaining means comprises a first protrusion extending inwardly from a first one of said side walls and a second protrusion extending inwardly from a second one of said side walls.

8. The inflatable dam assembly as claimed in claim 7, wherein the protrusions having a substantially semi-cylindrical shape.

9. The inflatable dam assembly as claimed in claim 7, wherein the duct comprises separate first and second components, the first component including the first protrusion and the second component including the second protrusion, and wherein the first and second components are secured to each other to form the duct.

10. The inflatable darn assembly as claimed in claim 5, wherein a distance between the base of the duct and the neck region is at least two times a dimension of the anchoring element.

11. The inflatable dam assembly as claimed in claim 5, wherein the anchoring element is substantially cylindrical.

12. A method of installing an inflatable dam assembly, the dam assembly comprising an inflatable membrane, an inflation manifold, an anchoring element, and a duct having a base, an opening and retaining means, and the method comprising the steps of:
positioning the duct in a trench in the ground, an upper chamber of the duct being defined between the neck region and the opening and a lower chamber of the duct being defined between the neck region and the base;
locating the anchoring element within the inflatable membrane;
locating the inflation manifold within the anchoring element, the anchoring element and the inflation manifold including one or more holes to enable inflation of the membrane;
positioning the anchoring element within the lower chamber of the duct such that the retaining means retains the anchoring element within the duct; and
housing the remainder of the membrane, in a deflated state, within the upper chamber of the duct
wherein the lower chamber of the duct is dimensioned such that the anchoring element is moveable relative to the duct in a first direction towards the retaining means and in a second direction away from the retaining means.

13. The method as claimed in claim 12, in which the duct has opposing side walls and the retaining means comprises opposing first and second protrusions, a first protrusion extending inwardly from a first one of said side walls and a second protrusion extending inwardly from a second one of said side walls, and the duct comprises separate first and second components, the first component including the first protrusion and the second component including the second protrusion, and wherein the method comprises:
inserting the first component into the trench;
positioning the anchoring element with respect to the first component;
inserting the second component into the trench, such that the first and second protrusions retain the anchoring element within the lower chamber of the duct; and
securing the second component to the first component.

14. An inflatable dam assembly comprising:
an inflatable membrane;
means for inflating said membrane operably engaged with the inflatable membrane; and
a duct for housing the anchoring element and at least a part of said membrane, the duct comprising retaining means configured to retain the anchoring element within the duct,
wherein, in use, the anchoring element is moveable relative to the duct in a first direction towards the retaining means and in a second direction away from the retaining means, wherein a guide means comprises a guide rod and a end region of the inflatable membrane includes a plurality of apertures through which the rod is received.

* * * * *